(12) United States Patent
Buerklin

(10) Patent No.: US 6,352,228 B1
(45) Date of Patent: Mar. 5, 2002

(54) TRIPOD HEAD

(75) Inventor: Werner Buerklin, Emmendingen-Wasser (DE)

(73) Assignee: FLM GmbH Foto-, Licht-und Messtechnisches Zubehör, Emmendingen (DE)

( * ) Notice: Subject to any disclaimer, the term of this patent is extended or adjusted under 35 U.S.C. 154(b) by 0 days.

(21) Appl. No.: 09/383,175

(22) Filed: Aug. 25, 1999

(30) Foreign Application Priority Data

Aug. 29, 1998 (DE) .......................................... 198 39 461

(51) Int. Cl.[7] .............................................. F16M 11/02
(52) U.S. Cl. .................................. 248/181.1; 248/288.51
(58) Field of Search ........................... 248/181.1, 181.2, 248/288.51; 403/90

(56) References Cited

U.S. PATENT DOCUMENTS

| 1,798,446 A | | 3/1931 | Zerk | |
|---|---|---|---|---|
| 2,180,214 A | | 11/1939 | Rapp | |
| 3,211,405 A | * | 10/1965 | Fey | 248/181.1 |
| 4,447,139 A | * | 5/1984 | Duber | |
| 4,765,580 A | * | 8/1988 | Wright | 248/181.1 |
| 4,787,613 A | * | 11/1988 | Hayes | |
| 4,974,802 A | * | 12/1990 | Hendren | 248/181.1 |
| 5,505,415 A | * | 4/1996 | Brett | 248/181.1 |
| 5,806,821 A | * | 9/1998 | Phillips | 248/181.1 |

* cited by examiner

Primary Examiner—Alvin Chin-Shue
(74) Attorney, Agent, or Firm—Akin, Gump, Strauss, Hauer & Feld, L.L.P.

(57) ABSTRACT

A tripod head (1) has a universal joint, which has a ball joint (3) which is swivelably and rotatably mounted in a bearing housing (2). The universal joint is arranged between connection points (4, 5) situated on oppositely facing ends of tripod head (1), one of which is connected or connectable with a camera and the other with a tripod or similar mounting. For restricting the swivelability of the ball joint (3) about a swiveling axis (6) running through its center, the ball joint (3) is releasably connectable with an axial element (7). The axial element (7) is arranged outside and adjacent to the ball joint (3), and rotatably mounted on the bearing housing (2) about the swiveling axis (6). On its end facing the ball joint (3), the axial element (7) has at least one friction element (8) for at least friction-locking connection of the axial element (7) with the ball joint (3). The friction element (8) is pressable on the ball joint (3) with a pressing device (9).

18 Claims, 1 Drawing Sheet

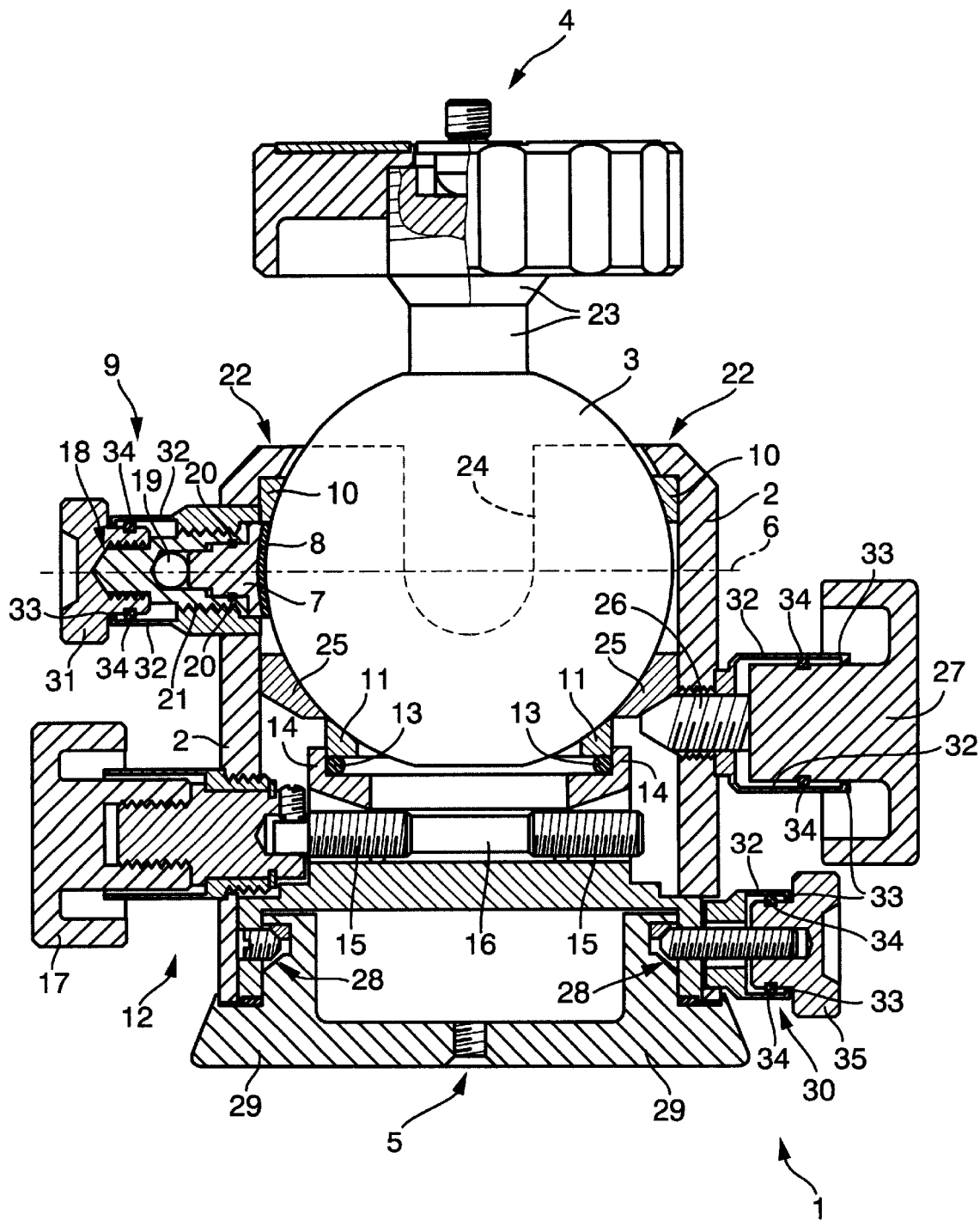

TRIPOD HEAD

BACKGROUND OF THE INVENTION

The invention concerns a tripod head with a universal joint, which has a ball joint swivelably and rotatably mounted in a bearing housing, wherein the universal joint is arranged between connecting points situated at oppositely facing ends of the tripod head, of which one is connected or connectable with a camera and the other with at least one tripod leg or similar mounting, wherein the ball joint, for restricting its swivelability to a swivelling motion about a swivelling axis running through the ball center point of the ball joint, is releasably connectable with an axial element.

Such a tripod head is known from U.S. Pat. No. 2,180,214 and from a prospectus of the firm EMO Optics, Wetzlar (1994). It has an axial element which, in the operating position, is inserted into a bore hole of the ball joint and with another portion penetrates an opening of the bearing housing. To release the swivelability of the ball joint in any desired direction, the axial element can be removed from the ball joint and the bearing housing. In the operating position, the axial element inserted into the bore hole of the ball joint forms a swivel bearing which fixes the swivelability and the rotatability of the ball joint relative to the bearing housing in a way such that the ball joint is still swivelable only about the swiveling axis, and is moreover blocked. It is thereby possible to incline a camera fastened to the tripod head in a swiveling plane running exactly perpendicular to the swiveling axis, without there existing the danger of the camera inadvertently tipping about the center of the ball joint transverse to the swiveling plane, or rotating about an axis running in the swiveling plane through the center of the ball joint.

The previously known tripod has the disadvantage that the axial element, when removed from the bore hole of the ball joint, can easily become lost, so that the swivelability of the ball joint can then no longer be fixed. A further disadvantage consists in that the insertion of the axial element into the ball joint requires a certain adroitness, since the opening situated in the bearing housing must be brought precisely into alignment before inserting the axial element in the bore hole of the ball joint. Moreover, the axial element must be positioned exactly axially in relation to the opening and the bore hole, so that the axial element can be inserted into the ball joint.

SUMMARY OF THE INVENTION

There thus exists the object of creating a tripod head of the type mentioned at the beginning in which the swivelability of the ball joint relative to the bearing housing is fixable in a simple way, such that the ball joint is only still swivelable about the swiveling axis and is furthermore fixed. In addition, the ball joint fixed in its swivelability should be re-releasable in a simple manner for swiveling or rotating it about any chosen axis running through the middle point of the ball joint, whereby the danger of losing the axial element is should be avoided.

The solution of this objective with a generic tripod head consists in that the axial element is arranged outside and adjacent to the ball joint and is pivotably mounted there on the bearing housing about the swiveling axis, that the axial element has on its end facing the ball joint at least one friction element for at least friction-locking connection with the ball joint, and in that a pressing device is provided by which the friction element is pressable on the ball joint.

Advantageously, the axial element is therefore connectable with the ball joint in a friction-locking manner, so that the axial element for fixing the swivelability of the ball joint is only pressed on the outer periphery of the ball joint and only needs to be withdrawn from this to release the swivelability of the ball joint. Moreover, it is even possible to connect the axial element with the ball joint in a friction-locking manner in various pivoting and/or swiveling positions of the ball joint in the bearing house, whereby the swivelability of the ball joint can be fixed about various swiveling axes. The axial element can be connected with the bearing housing in the fixed position or in the release position, whereby a loss of the axial element is avoided.

In an especially advantageous embodiment of the invention, the friction element has a concave friction surface adapted to the curvature of the ball joint. The friction element in the operating position then engages flatly on the outer circumference of the ball joint, which makes possible the transmission of correspondingly large forces of friction, and consequently a good restriction of the swivelability of the ball joint to a pivoting motion about a swiveling axis running through the center of the ball joint.

In an advantageous embodiment, it is provided that on both sides of a central plane of the ball joint at least one ring bearing is respectively arranged in the bearing housing, which has at least one respective sliding surface acting against a restoring force on the outer circumference of the ball joint, and that the friction element of the axial element engages on an outer peripheral area of the ball joint situated between the bearings. The ring bearings can thereby be pressed with a defined pressing force against the ball joint, so that the ring bearings exert a friction moment (torque) on the ball joint when swiveling or rotating the ball joint which, with a positioning of the camera with its center of gravity laterally spaced from a vertical through the center of the ball joint, wholly or partially compensates for a rotation moment (torque) acting on the ball joint by the weight of the camera. Advantageously, the friction moment transmitted from the ring bearings to the ball joint is largely independent of the pressing force by which the friction element is pressed on the ball joint. When the friction element in release position is pressed on the ball joint, a portion of the ring bearing situated on the same side of the ball joint as the friction element is namely respectively relieved, and at the same time, a portion of the ring bearing lying opposite this portion, arranged on the side of the ball joint facing away from the friction element, is more strongly loaded.

It is especially advantageous if at least one of the ring bearings is acted upon by an adjustable pressing force, and if an adjusting mechanism is preferably provided for this, which has within its transmission path at least one spring elastic element as well as at least one impinging piece having an inclined surface movable by means of a manual activation element. The friction moment of the ball joint can then be adapted to the respective weight of the camera, whereby this friction moment is largely independent of whether the friction element is connected in a friction-locking manner with the ball joint or is loosened from this.

It is provided in a preferred embodiment of the invention that the pressing device for the axial element has an adjusting element movable approximately radially to the center of the ball joint, and that the adjusting element is braced on the axial element through a pressure bearing, in particular having a pressure ball. A simply constructed point bearing thereby results, which makes possible a largely friction-free transmission of pressing force from the adjusting element to the axial element rotatable relative thereto about the swiveling axis, when the ball joint is swivelled in the bearing housing.

An especially simply constructed pressing device, by which a comparatively large pressing forces can be applied and transmitted to the friction element, can be achieved by the adjusting element having a screw thread arranged preferably concentrically to the swiveling axis of the ball joint, which is screwable together with a matching thread of the bearing housing for a separable connection of the axial element with the ball joint.

It is advantageous if the adjusting element has an inner cavity in which the axial element is rotatably mounted about the swiveling axis of the ball joint. The axial element is then arranged partially in the interior of the adjusting element, which makes possible a particularly compactly constructed mounting.

A preferred and especially advantageous embodiment provides that the friction element is made of rubber and the ball joint of metal, especially of anodized aluminum. Experiments have shown that with a friction element of rubber, an especially good friction-locking connection between the axial element and the ball joint is possible. Due to the elasticity of the material of the friction element, positional changes of the ball joint in relation to the friction element can be balanced out by swiveling the ball joint in the bearing housing, so that the friction element is at all times pressed against the ball joint, independently of the respective swiveling position of the ball joint, with a sufficient press-on force.

In an especially advantageous embodiment of the invention, it is provided that the bearing housing has an opening from which the ball joint partially protrudes, that on the portion of the ball joint protruding from the opening a shaft element connectable with the camera is arranged, and that the edge area of the bearing housing surrounding the opening has at least one slot into which the shaft element is partially swivelable and is preferably positionable such that the connecting line between the connection point for the mounting and the center of the ball joint, on the one hand, and the connecting line between the connection point for the camera and the center of the ball joint, on the other hand, are arranged at approximately right angles to each other. Moreover, it is even possible that the dimension of the slot oriented in the peripheral direction of the edge area surrounding the opening is adapted to the cross sectional dimension of the shaft element, and that when the shaft element is swivelled into the slot, the connecting line between the connection point for the camera and the center of the ball joint runs at right angles to the swiveling axis of the axial element. Consequently, the ball joint, by swiveling the shaft element into the slot, can be brought into a defined position to the swiveling axis, in which the connecting line between the connection point for the camera and the center of the ball joint runs at right angles to the swiveling axis of the axial element. In this position the axial element can be pressed in a friction-locking manner onto the ball joint, so that the camera then moves in a plane when the ball joint swivels about the swiveling axis, whereby a tumbling motion of the camera is avoided.

It is advantageous if the tripod head has a rotation joint arranged preferably between the ball joint and the tripod connection point, by which the tripod head end having the tripod connection point is rotatable relative to the tripod end having the camera connection point, and if the rotation axis of the rotation joint is arranged at right angles to the swiveling axis and runs preferably through the center of the ball joint. The camera can then, for example, be rotated or swivelled in a horizontal plane around the axis of rotation of the rotation joint for photographing or filming a panorama.

Expediently, the tripod head has a setting device for fixing the ball joint, which has a clamping element clampable with the ball joint. The ball joint can then be locked in the bearing housing in all swiveling or rotation directions.

Expediently, the tripod head has at least one manual activation element which, relative to the bearing housing, is displaceable along a displacement axis, and is optionally rotatable about this, wherein the manual activation element has at least one protruding, shearable projection on its outer circumference, wherein the manual activation element engages with a portion having the projection into the interior of a holding sleeve connecting with the bearing housing extending in the direction of the displacement axis, and wherein the holding sleeve has at least one catch, preferably constructed as a collar, against which the projection is positionable by displacing the manual activation element along the displacement axis. The catch has a lead-in slope on its side facing away from the projection, when the manual activation element is in operating position, and a catching surface on the side facing the projection which is arranged at a steeper angle relative to the displacement axis than the lead-in slope.

The manual activation element can then be moved in the displacement direction to activate an equipment function of the tripod head, wherein the catch area of the catch limits the displacement path of the manual activation element in the pull off direction, so that this cannot be inadvertently pulled off of the holding sleeve. If the manual activation element is ever damaged, which can, for example, take place in connection with careless manipulation with a tripod having a tripod head, the manual activation element can be removed by applying a relatively large tractive force in the pull off direction. In this process the projection of the manual activation element shears off there on the catching surface of the catch. A new manual activation element can then be inserted into the holding collar, wherein upon insertion of the manual activation element its projection slides along on the lead-in slope inclined in the inlet direction, without being sheared off. The projection is preferably made of a more pliable material than the actual manual activation element, for example of rubber.

In an especially economically manufacturable manual activation element, the projection of the manual activation element is formed by an O ring inserted into a recess, preferably constructed as an annular groove.

BRIEF DESCRIPTION OF THE SEVERAL VIEWS OF THE DRAWING

The foregoing summary, as well as the following detailed description of the invention, will be better understood when read in conjunction with the appended drawings. For the purpose of illustrating the invention, there are shown in the drawing embodiment(s) which are presently preferred. It should be understood, however, that the invention is not limited to the precise arrangements and instrumentalities shown. In the drawing:

The sole FIGURE shows a tripod head, partially represented in cross section, wherein the cross sectional plane runs through the center of the ball joint and the connection points for the camera and the tripod legs.

DETAILED DESCRIPTION OF THE INVENTION

A tripod head, designated overall with 1, has a universal (ball) joint which has a ball joint 3 mounted in a bearing housing 2 so as to be swivelable and rotatable in any desired direction. The universal joint is arranged between the connection points 4, 5 situated on ends of the tripod head 1 facing away from each other, by which the connection point 4 is connectable with a camera and the connection point 5 with a tripod or a corresponding mounting.

For restricting the swivelability of the ball joint 3 to an imaginary swiveling axis 6 running through the center of the ball joint 3, the ball joint 3 is separably connected with an axial element 7. The axial element 7 is arranged outside and adjacent to the ball joint 3 and rotatably mounted on the bearing housing 2 about swiveling axis 6. On its axial end facing the ball joint 3, the axial element 7 has a friction element 8 by which it is connectable with the ball joint 3 in a friction-locking manner. For this purpose, the fiction element 8 is pressable with a pressing device 9 on the outer periphery of the ball joint, and withdrawable from this.

As is recognizable from the cross sectional representation in FIG. 1, the friction element 8 is constructed as a friction plate having a concave friction surface adapted to the curvature of the ball joint 3 or its radius, which lies flatly on the ball joint 3 in operating position. The friction element 8 pressed on the ball joint 3 by means of the pressing device 9 thereby has a good friction-locking connection with the ball joint 3. The friction element 8 is preferably made of rubber and is partially embedded in a recess depression of the axial element 7.

On both sides of a horizontal central plane of the ball joint 3 running through the center of the ball, a respective ring bearing 10, 11 is arranged in the bearing housing 2, which lies on the periphery of the ball joint 3. It is recognizable in FIG. 1 that both ring bearings 10, 11 are arranged on planes running approximately parallel to each other. At the same time, these planes run approximately at right angles to the connection axis between the connection point 5 for the tripod and the center of the ball joint 3. The ring bearings 10, 11 are made of plastic and have sliding surfaces which lie on the circumference of the ball joint 3.

The ring bearing 11 is allocated an adjusting mechanism 12 by which the ring bearing 11 is pressable against the ball joint 3 with an adjustable press-on force. The adjusting mechanism 12 has, within its transmission path, an O-ring 13 as an elastic element, which lies on the back side of the ring bearing 11 facing away from the ball joint 3 and floatingly mounts the ring bearing 11. With a sealing line facing away from the ring bearing 11, running in the direction of the periphery, the O-ring 13 lies on a thrust ring 14, which bounds and centers the O-ring 13 and the ring bearing 11 with a collar.

The thrust ring 14 has on its back side facing away from the O-ring 13 an inclined surface, which runs on a conic jacket arranged concentrically to the center of the ball joint 3. On portions lying diametrically opposite each other, the thrust ring 14 is respectively supported by a impinging piece 15 which flatly engages with an inclined surface on the thrust ring 14. The impinging pieces 15 are constructed as spindle nuts, which are respectively arranged on a thread segment of a common span bolt 16, which is rotatably mounted in the bearing housing 2 and stands in drive connection with a manual activation element 17. The thread segments respectively allocated to the impinging pieces 15 have a rotation direction running opposite to each other, so that the impinging pieces 15 are moved either toward each other or away from each other according to the direction of rotation of the span bolt 16.

On their ends facing away from the thrust ring 14, the impinging pieces 15 are respectively braced against the bearing housing 2, so that the pressure ring 14 moves toward the ball joint 3 when the impinging pieces 15 are moved toward each other and are moved away from the ball joint 3 with a movement of the impinging pieces 15 in the opposite direction. At the same time, the O-ring 13 is more or less strongly compressed, according to the position of the thrust ring 14 relative to the ball joint 3, which brings forth a corresponding reactive force on the O-ring 13, which is transmitted via the ring bearing 11 to the ball joint 3. The pressing force of the ring bearing 11, and consequently the friction moment transmitted from the ring bearing 11 to the ball joint 3 when the ball joint 3 is swivelled, is thus adjustable by means of the adjusting mechanism 12.

As is recognizable from FIG. 1, the friction element 8 of the axial element 7 engages an outer circumference area of the ball joint 3 situated between the ring bearings 10 and 11, whereby the pressing force of the friction element 8 is oriented substantially parallel to the planes defined by the ring bearings 10, 11. The pressing force transmitted to the ball joint 3 via the friction element 8 therefore effects an increase in the pressing force on the ball joint 3 by the portion of the ring bearing 10 arranged on the side of the ball joint 3 facing away from the friction element 8. As a counter balance thereto, there results on the side of the ball joint 3 facing the friction element 8 an unloading of the ring bearing 10, since there a portion of the bracing forces is assumed by the friction element 8. Overall, there results thereby a certain compensation of the bearing and holding forces acting on the ball joint 3, whereby the friction moment of the ball joint 3, which is adjustable by means of the adjusting mechanism 12, is largely independent of whether the friction element 8 is pressed on the ball joint 3 or is loosened from this.

The pressing device 9 for the axial element 7 has an adjusting element 18 movable approximately radially in relation to the center of the ball joint 3. The adjusting element 18 is supported with a thrust bearing having a thrust ball 19 on the axial element 7. The thrust ball 19 is inserted into an inner cavity of the adjusting element 18, open in the direction of the ball joint 3, which tapers proceeding from the center of the thrust ball 19 to the deepest point of the inner cavity.

The axial element 7 engages with a portion into the inner cavity of the adjusting element 18 and is pivotably mounted there by means of a sliding bearing about the swiveling axis 6. With a retaining ring 20 situated in a plane arranged at right angles to the swiveling axis 6, the axial element 7 is connected in a form-locking manner with the adjusting element 18 in an axial direction. The axial element pressed onto the ball joint 3 can thus be pulled off of the ball joint 3 by appropriate adjustment of the adjusting element 18.

The adjusting element 18 has a screw thread constructed as an interior thread arranged concentrically to the swiveling axis of the ball joint, which is screwable together with a matching thread 21 of the bearing housing 2 for releasable connection of the axial element 7 with the ball joint 3. For this purpose, the adjusting element 18 bears on its end facing away from the friction element 8 a manual activation element 31.

The bearing housing 2 has on its end facing away from the connection point 5 for the tripod an opening from which the ball joint 3 partially projects. The edge area 22 surrounding the opening thereby reaches behind the ball joint 3. On the portion of the ball joint 3 protruding from the opening, a shaft element 23 is arranged, joined in one piece with the ball joint 3, which extends approximately radially to the center of the ball joint 3 and has, on its end facing away from the ball joint 3, the connection point 4 for the camera.

The edge area 22 surrounding the opening of the bearing housing 2 has a slot 24 into which the shaft element 23 is swivelable and can be brought into a position in which the connection line between the connection point 5 for the tripod or the mounting and the center of the ball joint 3, on the one hand, and the connection line between the connection point 4 for the camera and the center of the ball joint 3, on the other hand, are arranged at approximately right angles to each other. The slot has an approximately U-shaped cross section, wherein the central axis of the slot 24 is arranged essentially in a plane at right angles to the swiveling axis 6 and running through the center of the ball joint 3.

The clear width between the U legs of the slot 24 corresponds to the diameter of the shaft element 23 or is somewhat larger than this, and the slot 24 is so arranged that, when the shaft element 23 is swivelled into the slot 23, the connecting line between the connection point 4 for the camera and the center of the ball joint 3 runs at right angles to the swiveling axis 6 of the axial element 7.

The inclining function of the tripod head 1 can be activated in any ball position by pressing the axial element 7 onto the ball joint 3, whereupon the ball joint 3 is still movable only about the swiveling axis 6 and is inhibited in other motions. An exact orientation of the plane in which the connection point 4 for the camera swivels about the center of the ball joint 3 can thereby be achieved in that the shaft element 23 is first of all swivelled into the slit in the bearing housing 2 formed by the slot 24, and then the friction element 8 of the axial element 7 is pressed onto the ball joint 3 with the pressing device 9, in order to activate the inclining function.

To fix the ball joint 3 in a desired position, the tripod head 1 has a setting device with a clamping ring 25 which lies flatly with its inner periphery on the ball joint 3 and with its extension plane arranged approximately parallel to the extension planes of the ring bearings 10, 11. On its outer periphery facing away from the ball joint 3, the clamping ring 25 is supported against the bearing housing 2. The clamping ring 25 has an incline on the outer periphery, which is clampable within the conical end area of a thread bolt 26 screwed in with a thread of the bearing housing 2. For setting and releasing the clamping ring 25 from the ball joint 3, the thread bolt 26 is rotatable with a manual activation element 27.

The tripod head 1 furthermore has a rotation joint 28 arranged between the ball joint 3 and the connection point 5 for the tripod, by which the bearing housing 2 of the ball joint 3 is rotatable about an axis running through the connection point 5 for the tripod and the center of the ball joint 3 relative to a base element 29 having the tripod connection point 5.

With the rotation joint 28, for example, several portions of the panorama arranged side by side can be photographed sequentially. With a latch 30 the rotation joint 28 is releasably settable in any desired rotation position.

The manual activation elements 27, 31, 35 are respectively displaceable relative to the bearing housing 2 by a rotation movement along a displacement axis respectively allocated to them. For this purpose, with the manual activation elements 27, 35, respectively, a thread bolt 26 on which the manual activation element 27, 35 is fixed is screwed into or out of the bearing housing 2, and with manual activation element 17, the adjusting element 18 is screwed into or out of the bearing housing 2.

The manual activation elements 27, 31, 35 have on their respective outer peripheries a radially projecting, shearable projection formed by an O-ring 34, which is partially inserted into an annular groove of the manual activation element 27, 31, 35, and runs around the manual activation element 27, 31, 35 in the peripheral direction.

The manual activation elements 27, 31, 35 with their portions having the O-ring 34 repectively engage into the inner cavity of a holding sleeve 32 extending in the direction of the respective displacement axis. This has a catch 33 constructed as a collar which projects into the inner cavity of the holding sleeve 32 and partially reduces its free width. By moving the manual activation element 27, 31, 35 in the operating position along the displacement axis allocated to it, the projection of the manual activation element 27, 31, 35 is positionable against the catching surface of the catch 33. An inadvertent screwing off of the manual activation elements 27, 31, 35 from the bearing housing 2 is thereby avoided.

By a screwing off motion of the manual activation element 27, 31, 35 beyond a pressure point, an area of the O-ring 34 lying on the catching surface of the catch 33, arranged at approximately right angles to the displacement axis of the manual activation element 27, 31, 35 and projecting beyond the outer periphery of the manual activation element 27, 31, 35, can be sheared off or separated to remove the manual activation element 27, 31, 35 from the bearing housing. This can become necessary, for example, if the manual activation element 27, 31, 35 should ever be damaged and must be replaced by a new one.

The new manual activation element 27, 31, 35 is subsequently inserted into the holding sleeve 32. On its side facing away from the O-ring 34, when the manual activation element 27, 31, 35 is in operating position, the catch 33 has in the inlet direction of the manual activation element 27, 31, 35 an inclined lead-in slope. The O-ring can thereby be inserted over the catch 33 into the inner cavity of the holding sleeve 32, when the manual activation element 27, 31, 35 is installed, without being destroyed. Consequently, the manual activation element 27, 31, 35 can be exchanged in a simple manner.

I claim:

1. A tripod head (1) for connection of a camera with a mounting, comprising camera and mounting connection points (4, 5) situated at oppositely facing ends of the tripod head (1), the camera connection point (4) for connection with a camera and the mounting connection point (5) for connection with at least one mounting, a universal joint arranged between the connection points (4, 5) and having a ball joint (3) swivelably and rotatably mounted in a bearing housing (2), the ball joint (3) having a swiveling axis (6) running through its center, and the bearing housing (2) having an axial element (7) rotatably mounted thereon about the swiveling axis (6), the axial element being arranged outside of and adjacent to the ball joint (3) for releasable connection with the ball joint (3) to restrict swivelability of the ball joint (3) to a swiveling motion about the swiveling axis (6), the axial element (7) having on its end facing the ball joint (3) at least one friction element (8) for at least friction-locking connection with the ball joint (3) and a pressing device (9) for pressing the friction element (8) against the ball joint (3), wherein the pressing device (9) has an adjusting element (18) movable approximately radially toward the center of the ball joint (3), and wherein the adjusting element (18) is supported on the axial element (7) by a thrust bearing having a thrust ball (19).

2. The tripod head according to claim 1, wherein the friction element (8) has a concave friction surface adapted to a curvature of the ball joint (3).

3. The tripod head according to claim 1, wherein the bearing housing (2) has at least one ring bearing (10, 11) arranged on each side of a central plane of the ball joint (3), each ring bearing (10, 11) having at least one sliding surface operating against a restoring force and lying on an outer periphery of the ball joint (3), and wherein the friction element (8) of the axial element (7) engages with an outer peripheral area of the ball joint (3) situated between the ring bearings (10, 11).

4. The tripod head according to claim 3, wherein at least one of the ring bearings (10, 11) has an adjusting mechanism (12) for applying an adjustable pressing force against the bearing, the adjusting mechanism (12) having within its force transmission path at least one spring elastic element and at least one impinging piece (15) having an inclined surface and being movable by a manual activation element (17).

5. The tripod head according to claim 4, wherein the manual activation element (17) and/or at least one further manual activation element (27, 31, 35) is displaceable relative to the bearing housing (2) along a displacement axis and is optionally rotatable about the displacement axis, wherein at least one of the manual activation elements (17, 27, 31, 35) has at least one protruding and shearable projection on its outer periphery, wherein a portion of the at least one manual activation element (17, 27, 31, 35) having the projection engages into an inner cavity of a holding sleeve (32) connected with the bearing housing (2) and extending in a direction of the displacement axis, wherein the holding sleeve (32) has at least one catch (33) constructed as a collar engaging into the inner cavity, the projection being positionable against the catch by displacing the at least one manual activation element (17, 27, 31, 35) along the displacement axis, wherein the catch (33) has a lead-in slope on a side facing away from the projection when the at least one manual activation element (17, 27, 31, 35) is in operating position and has a catching surface on a side facing the projection which is arranged at a steeper angle to the displacement axis than the lead-in slope.

6. The tripod head according to claim 5, wherein the projection of the at least one manual activation element (17, 27, 31, 35) is formed by an O-ring inserted into a recess of the at least one manual activation element (17, 27, 31, 35), the recess being constructed as an annular groove (35).

7. The tripod head according to claim 1, wherein the adjusting element (18) has a screw thread arranged concentrically to the swiveling axis (6) of the ball joint (3), the screw thread being screwable together with a matching thread (21) of the bearing housing (2) for releasable connection of the axial element (7) with the ball joint (3).

8. The tripod head according to claim 1, wherein the adjusting element (18) has an inner cavity in which the axial element (7) swivels about the swiveling axis (6).

9. The tripod head according to claim 1, wherein the friction element (8) comprises rubber and the ball joint (3) comprises metal.

10. The tripod head according to claim 9, wherein the ball joint (3) comprises anodized aluminum.

11. The tripod head according to claim 1, wherein the swiveling axis (6) is arranged at right angles to a connecting line between the mounting connection point (5) and the center of the ball joint (3).

12. The tripod head according to claim 1, wherein the bearing housing (2) has an opening from which the ball joint (3) partially protrudes, wherein on a portion of the ball joint protruding from the opening a shaft element (23) is arranged for the camera connection (4), and wherein an edge area (22) of the bearing housing (2) surrounding the opening has at least one slot (24) into which the shaft element (23) is at least partially swivelable into a position in which a connecting line between the mounting connection point (5) and the center of the ball joint (3), on one hand, and a connecting line between the camera connection point (4) and the center of the ball joint (3), on another hand, are arranged at approximately right angles to each other.

13. The tripod head according to claim 12, wherein a dimension of the slot (24) oriented in a direction of a periphery of the edge area (22) surrounding the opening is adapted to a cross sectional dimension of the shaft element (23), and wherein, when the shaft element (23) swivels into the slot (24), the connecting line between the camera connection point (4) and the center of the ball joint (3) runs at right angles to the swiveling axis (6) of the axial element (7).

14. The tripod head according to claim 1, further comprising a rotation joint (28) arranged between the ball joint (3) and the mounting connection point (5) with which the tripod head end having the mounting connection point (5) is pivoted relative to the tripod head end having the camera connection point (4), and wherein the rotation joint (28) has an axis of rotation arranged at right angles to the swiveling axis (6) and running through the center of the ball joint (3).

15. The tripod head according to claim 1, further comprising a fixing device for setting the ball joint (3), the fixing device having a clamping ring (25) clampable with the ball joint.

16. A tripod head (1) for connection of a camera with a mounting, comprising camera and mounting connection points (4, 5) situated at oppositely facing ends of the tripod head (1), the camera connection point (4) for connection with a camera and the mounting connection point (5) for connection with at least one mounting, a universal joint arranged between the connection points (4, 5) and having a ball joint (3) swivelably and rotatably mounted in a bearing housing (2), the ball joint (3) having a swiveling axis (6) running through its center, and the bearing housing (2) having an axial element (7) rotatably mounted thereon about the swiveling axis (6), the axial element being arranged outside of and adjacent to the ball joint (3) for releasable connection with the ball joint (3) to restrict swivelability of the ball joint (3) to a swiveling motion about the swiveling axis (6), the axial element (7) having on its end facing the ball joint (3) at least one friction element (8) for at least friction-locking connection with the ball joint (3) and a pressing device (9) for pressing the friction element (8) against the ball joint (3), wherein the bearing housing (2) has at least one ring bearing (10, 11) arranged on each side of a central plane of the ball joint (3), each ring bearing (10, 11) having at least one sliding surface operating against a restoring force and lying on an outer periphery of the ball joint (3), wherein the friction element (8) of the axial element (7) engages with an outer peripheral area of the ball joint (3) situated between the ring bearings (10, 11), and wherein at least one of the ring bearings (10, 11) has an adjusting mechanism (12) for applying an adjustable pressing force against the bearing, the adjusting mechanism (12) having within its force transmission path at least one spring elastic element and at least one impinging piece (15) having an inclined surface and being movable by a manual activation element (17).

17. The tripod head according to claim 16, wherein the manual activation element (17) and/or at least one further manual activation element (27, 31, 35) is displaceable relative to the bearing housing (2) along a displacement axis and is optionally rotatable about the displacement axis, wherein the manual activation element (17, 27, 31, 35) has at least one protruding and shearable projection on its outer periphery, wherein a portion of the manual activation element (17, 27, 31, 35) having the projection engages into an inner cavity of a holding sleeve (32) connected with the bearing housing (2) and extending in a direction of the displacement axis, wherein the holding sleeve (32) has at least one catch (33) constructed as a collar engaging into the inner cavity, the projection being positionable against the catch by displacing the manual activation element (17, 27, 31, 35) along the displacement axis, wherein the catch (33) has a lead-in slope on a side facing away from the projection when the manual activation element (17, 27, 31, 35) is in operating position and has a catching surface on a side facing the projection which is arranged at a steeper angle to the displacement axis than the lead-in slope.

18. The tripod head according to claim 17, wherein the projection of the manual activation element (17, 27, 31, 35) is formed by an O-ring inserted into a recess of the manual activation element (17, 27, 31, 35), the recess being constructed as an annular groove (35).

* * * * *